(12) United States Patent
Hamada et al.

(10) Patent No.: US 10,858,018 B2
(45) Date of Patent: Dec. 8, 2020

(54) TRAIN INFORMATION MANAGEMENT DEVICE AND DOOR CONTROL SYSTEM

(71) Applicant: MITSUBISHI ELECTRIC CORPORATION, Tokyo (JP)

(72) Inventors: Shingo Hamada, Tokyo (JP); Masahiro Chikamori, Tokyo (JP); Masahiko Mitsukawa, Tokyo (JP); Satoshi Kaede, Tokyo (JP); Takashi Miyauchi, Tokyo (JP); Rie Wakana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 225 days.

(21) Appl. No.: 16/072,362

(22) PCT Filed: Feb. 15, 2016

(86) PCT No.: PCT/JP2016/054340
§ 371 (c)(1),
(2) Date: Jul. 24, 2018

(87) PCT Pub. No.: WO2017/141333
PCT Pub. Date: Aug. 24, 2017

(65) Prior Publication Data
US 2019/0031218 A1    Jan. 31, 2019

(51) Int. Cl.
*B61L 3/12* (2006.01)
*B61B 1/02* (2006.01)
(Continued)

(52) U.S. Cl.
CPC .............. *B61L 3/127* (2013.01); *B61B 1/02* (2013.01); *B61D 19/02* (2013.01); *B61L 3/125* (2013.01);
(Continued)

(58) Field of Classification Search
USPC .......................................................... 701/19
See application file for complete search history.

(56) References Cited

U.S. PATENT DOCUMENTS

2014/0358337 A1    12/2014  Ikejima et al.

FOREIGN PATENT DOCUMENTS

| JP | 10-264816 A | 10/1998 |
| JP | 11-348770 A | 12/1999 |

(Continued)

OTHER PUBLICATIONS

International Search Report (PCT/ISA/210) dated Apr. 19, 2016, by the Japan Patent Office as the International Searching Authority for International Application No. PCT/JP2016/054340.
(Continued)

*Primary Examiner* — Anthony R Jimenez
(74) *Attorney, Agent, or Firm* — Buchanan Ingersoll & Rooney PC

(57) ABSTRACT

A train information management device sends and receives information to and from both a train-controlling in-vehicle wireless station for controlling an operation of a train, and a door-controlling in-vehicle wireless station for controlling vehicle doors. The device includes a wireless train control unit, an automatic operation unit, and a door control unit. The wireless train control unit receives route information represented by a consecutive block sequence and information on a stop limit location that the train may reach without hindering a preceding train, and if this route information includes a station block number, consults an in-vehicle database to extract, before the train arrives at a platform, an arrival track where the train is to stop, a stop target location at a stop station dependent on a travel direction of the train, and which of the vehicle doors is to be opened, and stops the train in accordance with the route information.

7 Claims, 9 Drawing Sheets

(51) Int. Cl.
  *B61L 15/00* (2006.01)
  *B61L 27/00* (2006.01)
  *B61D 19/02* (2006.01)
  *B61L 25/02* (2006.01)

(52) U.S. Cl.
  CPC ....... *B61L 15/0027* (2013.01); *B61L 15/0072* (2013.01); *B61L 25/023* (2013.01); *B61L 25/025* (2013.01); *B61L 27/0077* (2013.01); *Y02T 90/16* (2013.01)

(56) References Cited

FOREIGN PATENT DOCUMENTS

| | | | |
|---|---|---|---|
| JP | 2007-203752 A | | 8/2007 |
| JP | 2011-213334 A | | 10/2011 |
| JP | 2015-139297 A | | 7/2015 |
| JP | 2016068802 A | * | 5/2016 |
| WO | WO 2013/105232 A1 | | 7/2013 |
| WO | WO 2014/041626 A1 | | 3/2014 |

OTHER PUBLICATIONS

Written Opinion (PCT/ISA/237) dated Apr. 19, 2016, by the Japan Patent Office as the International Searching Authority for International Application No. PCT/JP2016/054340.

\* cited by examiner

FIG.4

| STOP STATION NAME | ARRIVAL TRACK NAME | TRACK NAME | FIRST BLOCK NUMBER | SECOND BLOCK NUMBER | FIRST DIRECTION, STOPPING TARGET ||| SECOND DIRECTION, STOPPING TARGET ||| WIRELESS ID | DOOR OPENING SIDE |
|---|---|---|---|---|---|---|---|---|---|---|---|---|
| | | | | | NUMBER OF VEHICLES | BLOCK NUMBER | IN-BLOCK POSITION | NUMBER OF VEHICLES | BLOCK NUMBER | IN-BLOCK POSITION | | |
| COOPERATIVE STATION A | OUTBOUND TRACK 1 | OUT 1 | 5014 | 5015 | 10 | 5015 | 150 m | 10 | 5014 | 150 m | A-M1 | SEAWARD |
| | | | | | 15 | 5015 | 150 m | 15 | 5014 | 50 m | | |
| | OUTBOUND MAIN TRACK | OUT MAIN | 5004 | 5005 | 10 | 5005 | 150 m | | | | A-M2 | LANDWARD |
| | | | | | 15 | 5005 | 150 m | | | | | |
| | INBOUND MAIN TRACK | IN MAIN | 5054 | 5055 | | | | 10 | 5054 | 150 m | A-M3 | SEAWARD |
| | | | | | | | | 15 | 5054 | 50 m | | |
| | INBOUND TRACK 1 | IN 1 | 5064 | 5065 | 10 | 5065 | 150 m | 10 | 5064 | 150 m | A-M4 | LANDWARD |
| | | | | | 15 | 5065 | 150 m | 15 | 5064 | 50 m | | |

.# TRAIN INFORMATION MANAGEMENT DEVICE AND DOOR CONTROL SYSTEM

FIELD

The present invention relates to a train information management device, to an in-vehicle system, and to a door control system that each use wireless communication to provide cooperative control between a vehicle door of a train and a platform door.

BACKGROUND

In recent years, it is widely practiced that platform doors are installed on the platforms of a railroad station (hereinafter referred to simply as "station") for safety of train passengers. The open and close operations of a platform door are controlled by a ground-located device disposed on the platform. The open and close operations of a platform door are desirably controlled so as to cooperate with the open and close operations of a vehicle door of the train that has arrived at that platform.

Patent Literature 1, which provides one example of conventional technology, discloses a technology for the purpose of "providing a platform door control system that uses narrowband wireless communication to uniquely identify the train that has just arrived at a platform and the track of that platform, and relate the train to the track, thereby relating the train to the platform by using simple and low-cost wireless communication." In this technology, "this door control system is configured to include: a platform door control unit 66, an intended vehicle position detection unit 67, and a ground-located transmission unit 53, all disposed on a platform barrier 14 installed for each track of a platform 11; and an in-vehicle transmission unit 52 installed in a train 12 that is to arrive and stop at a platform. The ground-located transmission unit and the in-vehicle transmission unit each include low frequency (LF) wireless communication means (61, 63, 71, 72) for narrowband wireless communication to relate the track of the platform to the train vehicle door that is to be opened and closed, and radio frequency (RF) wireless communication units (62, 64, 75, 76) for broadband wireless communication to provide cooperation between the open and close operations of a door of the platform barrier and the open and close operations of a train vehicle door." In more detail, the platform door control system includes a ground-located transmission unit disposed on the platform, and an in-vehicle transmission unit installed in the train. The ground-located transmission unit and the in-vehicle transmission unit each include two types of wireless communication units. One is an LF wireless communication unit for narrowband wireless communication. Use of these LF wireless communication units causes "platform number information" to be transmitted from platform to train, and thus association is made between the train and the platform. The other is an RF wireless communication unit for broadband wireless communication. Use of these RF wireless communication units causes "door open-close state information" and "vehicle information" to be transmitted, in addition to "platform number information" described above, from train to platform. In response to "door open-close state information" received from the train, the platform door control device disposed on the platform performs open and close operations of the platform door.

CITATION LIST

Patent Literature

Patent Literature 1: Japanese Patent Application Laid-open No. 2011-213334

SUMMARY

Technical Problem

In the conventional technology described above, the ground-located transmission unit and the in-vehicle transmission unit each include first wireless communication means for performing wireless communication to relate a track of a platform to a train vehicle door that is to be opened and closed, and second wireless communication means for performing wireless communication to provide cooperation between the open/close operation of a platform door and the open/close operation of the train vehicle door. Thus, providing cooperative control between the open/close operation of a train vehicle door and the open/close operation of a platform door requires at least two wireless communication means in the vehicle. This presents a problem of a complex configuration.

The present invention has been made in view of the foregoing, and it is an object of the present invention to provide a train information management device capable of providing synchronous cooperative control between an open/close operation of a vehicle door of a train and an open/close operation of a platform door in a simpler configuration.

Solution to Problem

To solve the problem and to achieve the object described above, the present invention provides a train information management device to send and receive information to and from one or multiple in-vehicle wireless stations that each perform wireless communication for controlling an operation of a train and wireless communication for controlling a train vehicle door. The train information management device includes a wireless train control unit, an automatic operation unit, and a door control unit. The wireless train control unit sends and receives information to and from the in-vehicle wireless station that performs the wireless communication for controlling the operation of the train to control the operation of the train, receive route information represented by a consecutive block sequence, and information on a stop limit location that the train may reach without hindering a preceding train, and if the route information includes a station block number, consult an in-vehicle database stored in a form of a block number mapping table to identify an arrival track where the train is to stop, a stop target location at a stop station dependent on a travel direction, and a side on which the vehicle door is to be opened. The automatic operation unit automatically controls an operation of this train in accordance with an instruction from the wireless train control unit. The door control unit sends and receives information to and from the in-vehicle wireless station that performs the wireless communication for controlling the train vehicle door to control opening and closing of the train vehicle door. Upon reception of this route information when this train passes a location before the stop station, the wireless train control unit consults the block number mapping table to extract, before the train arrives at the platform, the arrival track at the stop station, the stop target location at the stop station dependent on the travel direction of the train, and the side on which the vehicle door is to be opened, stops the train based in accordance with this route information, and controls the vehicle door on one side or on each side in synchronization with the platform door.

Advantageous Effects of Invention

The present invention is advantageous in being capable of providing synchronous cooperative control between the open/close operation of the vehicle door of the train and the open/close operation of the platform door in the simpler configuration.

BRIEF DESCRIPTION OF DRAWINGS

FIG. 4 is a diagram illustrating an example of block number mapping table for a stop station stored in a train information management device according to the first embodiment.

DESCRIPTION OF EMBODIMENTS

A train information management device, an in-vehicle system, and a door control system according to embodiments of the present invention will be described in detail below with reference to the drawings. Note that these embodiments are not intended to limit this invention.

First Embodiment

Figure 1:
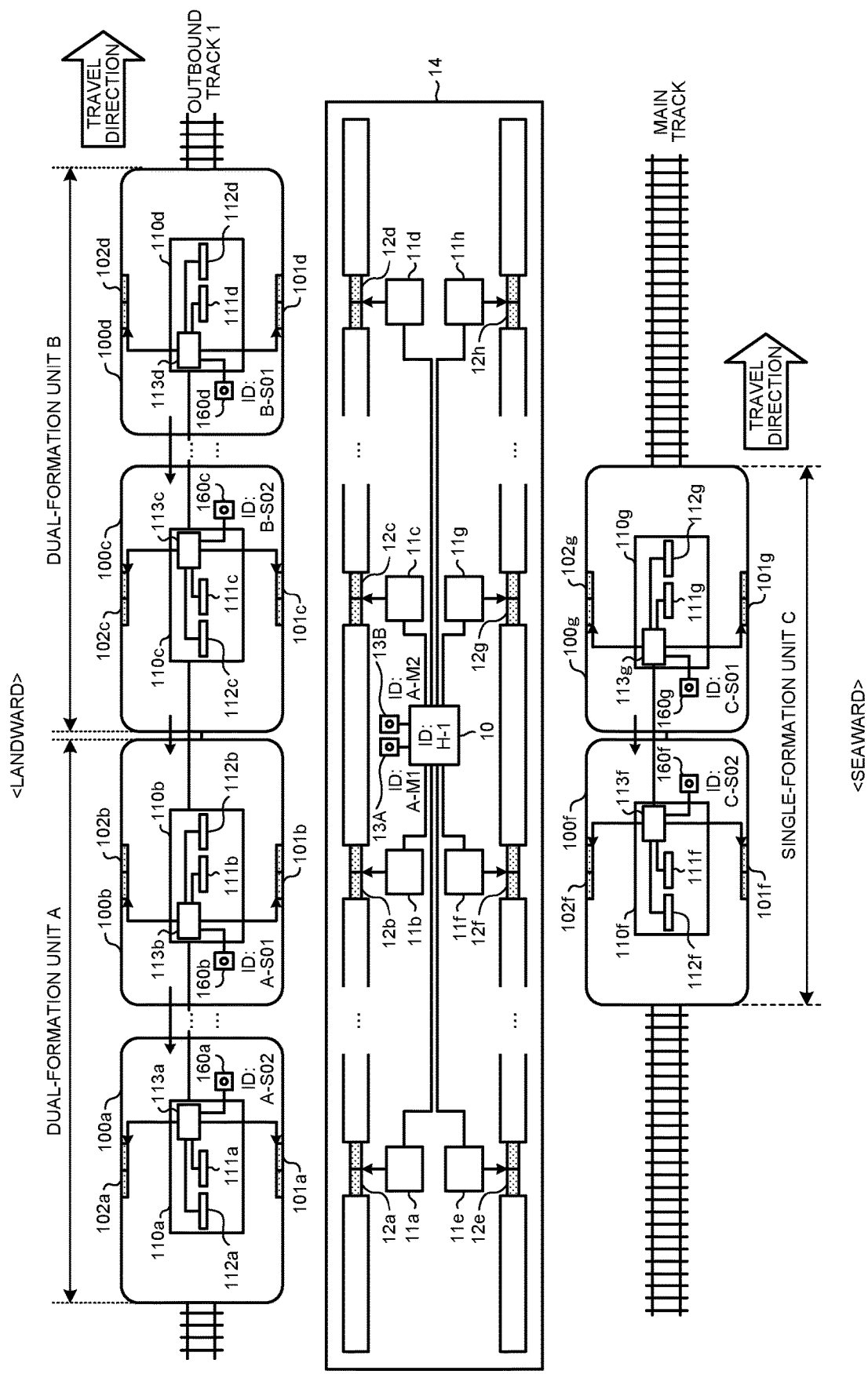
FIG. 1 is a diagram illustrating an example configuration of a door control system according to a first embodiment.

FIG. 1 is a diagram illustrating an example configuration of a door control system according to a first embodiment of the present invention. In FIG. 1, a dual-formation train has stopped on a landward track at a station 14, and a single-formation train has stopped on a seaward track at the station 14. The dual-formation train illustrated in FIG. 1 is defined by two different coupled trainsets A and B (hereinafter referred to "dual-formation unit A" and "dual-formation unit B"), which will be disconnected from each other for different terminals. The dual-formation unit A includes a vehicle 100a and a vehicle 100b, and the dual-formation unit B includes a vehicle 100c and a vehicle 100d. The single-formation train illustrated in FIG. 1 is defined by a single trainset (hereinafter referred to "single-formation unit C") including a vehicle 100f and a vehicle 100g. Although not illustrated in FIG. 1, the dual-formation unit A includes the vehicle(s) other than the vehicle 100a and the vehicle 100b, the dual-formation unit B includes the vehicle(s) other than the vehicle 100c and the vehicle 100d, and the single-formation unit C includes the vehicle(s) other than the vehicle 100f and the vehicle 100g. Note that both the dual-formation train and the single-formation train illustrated in FIG. 1 are down, or outbound trains, and no up, or inbound trains are illustrated in FIG. 1.

In FIG. 1, each train travels to the right. Thus, the dual-formation train includes the vehicle 100d as the leading vehicle, and the vehicle 100a as the rearmost vehicle, and the single-formation train includes the vehicle 100g as the leading vehicle, and the vehicle 100f as the rearmost vehicle.

For purposes of illustration, in FIG. 1, the left side with respect to the travel direction is labeled as landward side, and the right side with respect to the travel direction is labeled as seaward side.

The vehicle 100a of the dual-formation train includes a seaward vehicle door 101a, a landward vehicle door 102a, a train information management device 110a, and a door-controlling in-vehicle wireless station 160a. The vehicle 100b of the dual-formation train includes a seaward vehicle door 101b, a landward vehicle door 102b, a train information management device 110b, and a door-controlling in-vehicle wireless station 160b. The vehicle 100c of the dual-formation train includes a seaward vehicle door 101c, a landward vehicle door 102c, a train information management device 110c, and a door-controlling in-vehicle wireless station 160c. The vehicle 100d of the dual-formation train includes a seaward vehicle door 101d, a landward vehicle door 102d, a train information management device 110d, and a door-controlling in-vehicle wireless station 160d. The train information management device 110a includes a wireless train control unit 111a, an automatic operation unit 112a, and a door control unit 113a. The train information management device 110b includes a wireless train control unit 111b, an automatic operation unit 112b, and a door control unit 113b. The train information management device 110c includes a wireless train control unit 111c, an automatic operation unit 112c, and a door control unit 113c. The train information management device 110d includes a wireless train control unit 111d, an automatic operation unit 112d, and a door control unit 113d. Similarly, the vehicle 100f of the single-formation train includes a seaward vehicle door 101f, a landward vehicle door 102f, a train information management device 110f, and a door-controlling in-vehicle wireless station 160f. The vehicle 100g of the single-formation train includes a seaward vehicle door 101g, a landward vehicle door 102g, a train information management device 110g, and a door-controlling in-vehicle wireless station 160g. The train information management device 110f includes a wireless train control unit 111f, an automatic operation unit 112f, and a door control unit 113f. The train information management device 110g includes a wireless train control unit 111g, an automatic operation unit 112g, and a door control unit 113g.

The station illustrated in FIG. 1 includes platform doors 12a, 12b, 12c, 12d, 12e, 12f, 12g, and 12h; individual control panels 11a, 11b, 11c, 11d, 11e, 11f, 11g, and 11h that control opening and closing of the platform doors 12a, 12b, 12c, 12d, 12e, 12f, 12g, and 12h, respectively; and a platform door control device 10 that sends platform-door opening/closing instructions to the individual control panels 11a, 11b, 11c, 11d, 11e, 11f, 11g, and 11h to open/close the platform doors 12a, 12b, 12c, 12d, 12e, 12f, 12g, and 12h, respectively. The platform door control device 10 is connected to platform door wireless stations 13A and 13B. The platform door control device 10 has a wireless identifier (ID) "H-1." The platform door wireless station 13A has a wireless ID "A-M1." The platform door wireless station 13B has a wireless ID "A-M2." The platform door control device 10 wirelessly communicates with the door-controlling in-vehicle wireless stations 160a, 160b, 160c, 160d, 160f, and 160g. The platform door wireless stations 13A and 13B wirelessly communicate with the door-controlling in-vehicle wireless stations 160a, 160b, 160c, 160d, 160f, and 160g. The door-controlling in-vehicle wireless stations 160a, 160b, 160c, 160d, 160f, and 160g each incorporate an antenna. The term "platform-door opening/closing instruction" as used herein means an instruction on control to open the platform door or an instruction on control to close the platform door.

Figure 2:
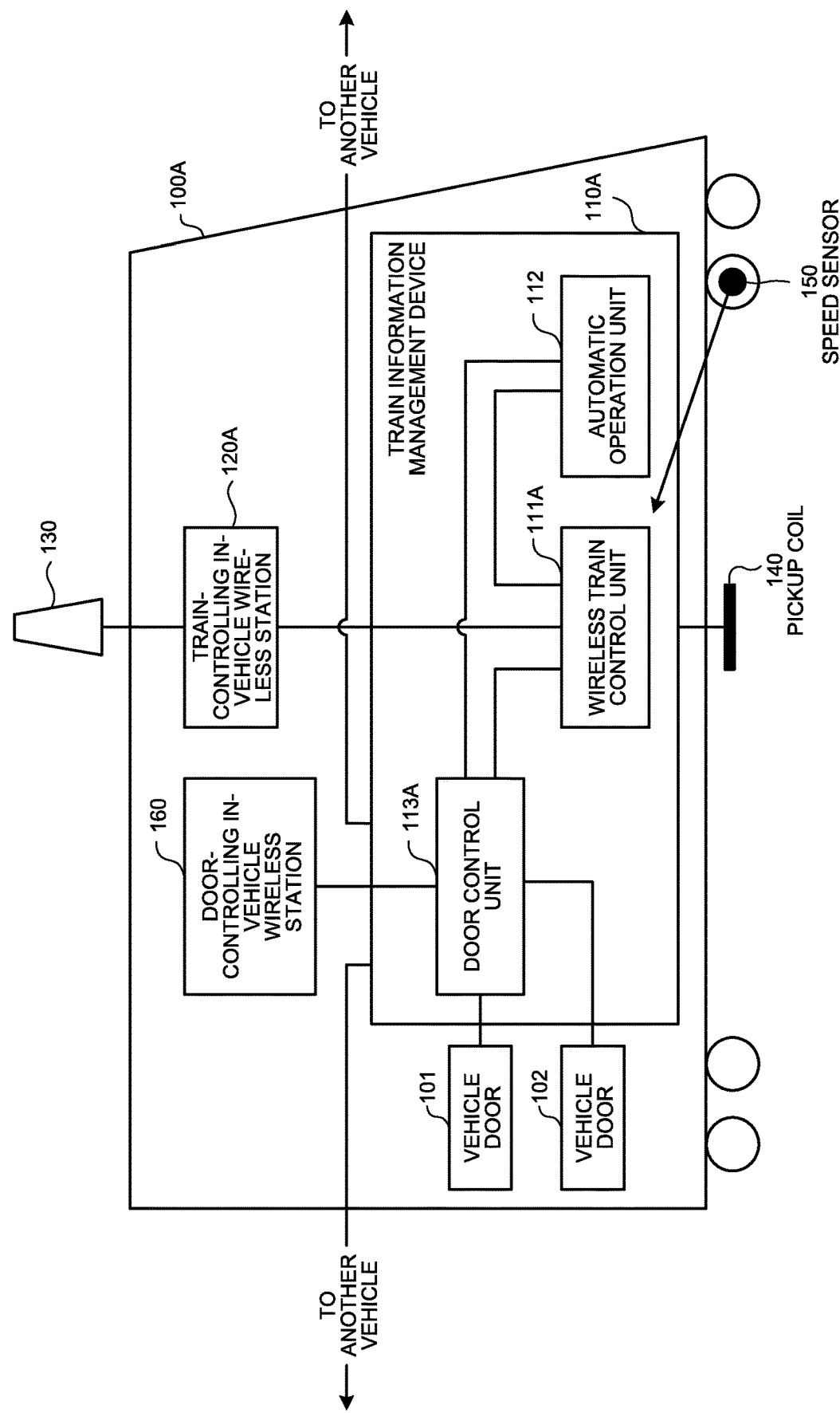
FIG. 2 is a diagram illustrating an example configuration of a train vehicle employing the door control system according to the first embodiment.

FIG. 2 is a diagram illustrating an example configuration of a train vehicle employing the door control system according to the first embodiment of the present invention. A vehicle 100A illustrated in FIG. 2 represents any one of the vehicles 100a, 100b, 100c, 100d, 100f, and 100g. The vehicle 100A includes a seaward vehicle door 101, a landward vehicle door 102, a train information management device 110A, a train-controlling in-vehicle wireless station 120A, an antenna 130, a pickup coil 140, a speed sensor 150, and a door-controlling in-vehicle wireless station 160. The train information management device 110A includes a wireless train control unit 111A, an automatic operation unit 112, and a door control unit 113A.

The train information management device 110A receives: train control information from a ground-located device via the train-controlling in-vehicle wireless station 120A; electrical text information from the pickup coil 140; speed information from the speed sensor 150; and information on door control from the platform door control device 10 via the door-controlling in-vehicle wireless station 160. The train information management device 110A sends: train control information to the ground-located device via the train-controlling in-vehicle wireless station 120A; and information on door control and train information to the platform door control device 10 via the door-controlling in-vehicle wireless station 160. Thus, the train information management device 110A manages train information. The train information management device 110A also sends and receives information to and from the train information management device(s) of other vehicle(s).

The wireless train control unit 111A generates train control information, and sends and receives information to and from the automatic operation unit 112, the door control unit 113A, and the train-controlling in-vehicle wireless station 120A. The automatic operation unit 112 sends and receives information to and from the wireless train control unit 111A and the door control unit 113A, and automatically drives the vehicle 100A. The automatic operation unit 112 is also referred to as "Automatic Train Operation (ATO)." The door control unit 113A generates door control information, sends and receives information to and from the wireless train control unit 111A, the automatic operation unit 112, and the door-controlling in-vehicle wireless station 160, and controls opening and closing of the vehicle doors 101 and 102.

The train-controlling in-vehicle wireless station 120A sends and receives, via the antenna 130, train control information to and from a ground-located wireless station connected to the ground-located device.

The pickup coil 140 receives on-land information from a wayside coil disposed along the track, and sends the on-land information to the train information management device 110A as electrical text information. Specifically, the on-land information includes a wayside coil ID number. An in-vehicle database includes location information on the wayside coil of the wayside coil ID number.

The speed sensor 150 is attached on an axle of the vehicle 100A. The speed sensor 150 sends a pulse signal containing speed information, to the train information management device 110A. The train information management device 110A recognizes the current location of the vehicle 100A, using the electrical text information received from the pickup coil 140 and a distance in kilometers calculated based on the speed information received from the speed sensor 150.

The door-controlling in-vehicle wireless station 160 wirelessly communicates with the platform door wireless stations 13A and 13B to send and receive the door control information from the door control unit 113A.

The term "train control information" as used herein means information required for controlling a train in a wireless train system, and includes train location information, speed information, travel direction information, the number of vehicles or the train length, and type-of-service information. The electrical text information is the wayside coil ID number received by the pickup coil from the wayside coil for recognizing information on the train location. The term "door control information" means information for controlling opening and closing of at least one vehicle door provided in each vehicle. The term "information on door control" means information to be referred to when the door control unit generates the door control information. The term "train information" means any information related to that train, and includes both the train control information and the door control information. The train length may be expressed in terms of the number of vehicles. The type-of-service information includes information on whether that train is a local train or an express train, and it is determined on the basis of this type-of-service information whether the next station is a stop station where the train will stop without going past.

Figure 3:
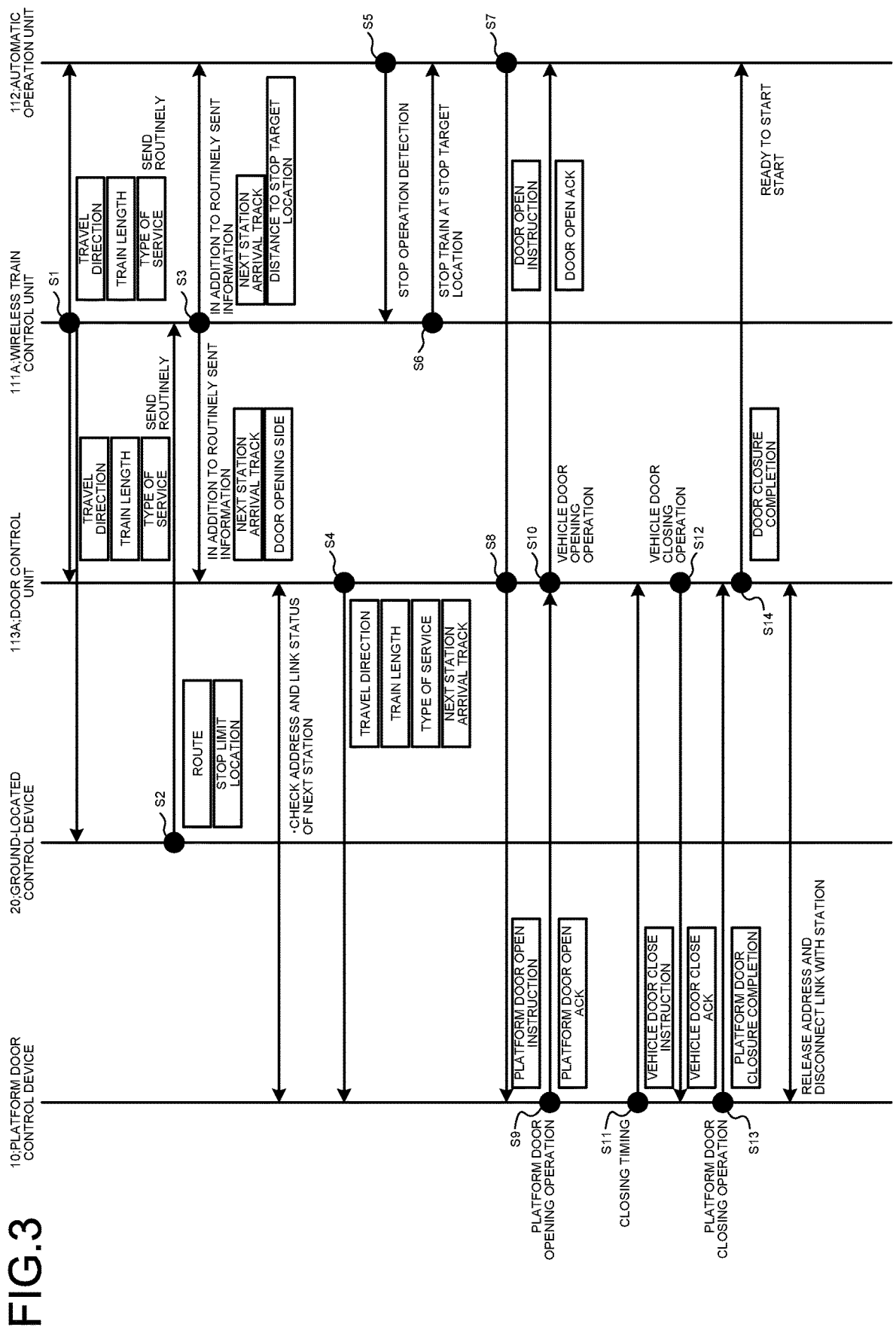
FIG. 3 is a diagram illustrating a sequence in the door control system where the vehicle configuration illustrated in FIG. 2 is applied in the first embodiment.

FIG. 3 is a diagram illustrating a sequence in the door control system where the vehicle configuration illustrated in FIG. 2 is applied. FIG. 3 also illustrates a ground-located control device 20, which is omitted in FIG. 1. The ground-located control device 20 is a ground-located device for sending and receiving information to and from the wireless train control unit 111A via a ground-located wireless station.

As illustrated in FIG. 3, during train operation, the wireless train control unit 111A routinely sends to the automatic operation unit 112, the door control unit 113A, and the ground-located control device 20 the train control information typified by the travel direction information, the train length information, and the type-of-service information on that train (step S1).

The train then approaches a next station that is the stop station. If the next station has a vacant, hence usable, track, the ground-located control device 20 sends route information represented by a consecutive block sequence, and information on a stop limit location, to the wireless train control unit 111A via the ground-located wireless station (step S2). The wireless train control unit 111A then extracts a station block number from the route information and from the information on the stop limit location received from the ground-located control device 20, and consults the in-vehicle database. Consulting the in-vehicle database enables identification of the track to be used by that train at the next station and identification of the door opening side, the door opening side being the side on which the doors of the train are to be opened at the next station. The ground-located control device 20 routinely sends the route information and the information on the stop limit location to the wireless train control unit 111A, and is capable of sending such pieces of information up to a location 1500 m ahead in the train travel direction. The term "station block number" as used herein means a block number assigned within a station.

Figure 5:
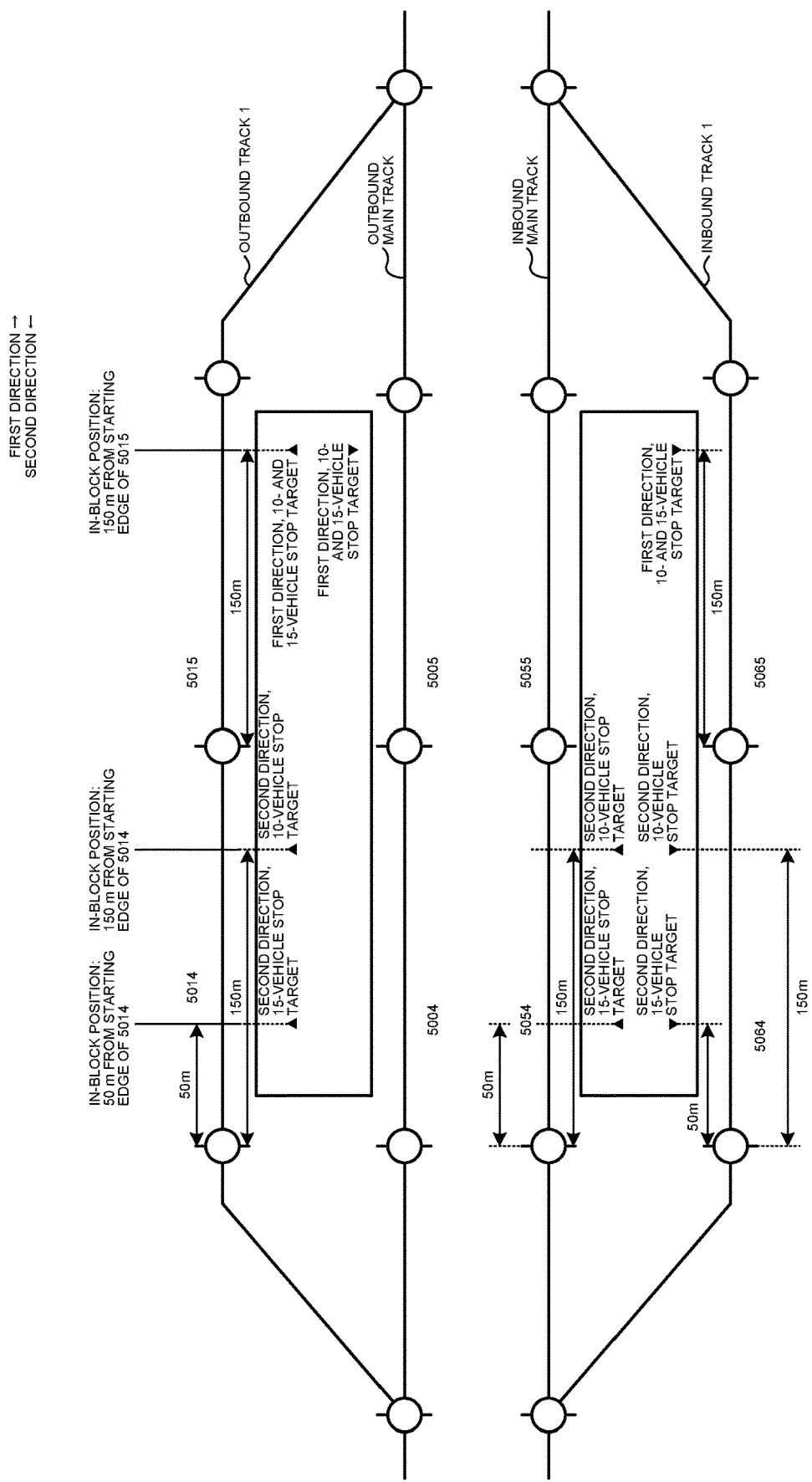
FIG. 5 is a diagram illustrating an example of actual positional arrangement of blocks in the stop station in the first embodiment.

FIG. 4 is a diagram illustrating an example of station block number mapping table for a cooperative station A that is the stop station equipped with the interlocking device, the table being stored in the train information management device according to this first embodiment. FIG. 5 is a diagram illustrating an example of actual positional arrangement of blocks in the cooperative station A that is the stop station equipped with the interlocking device. The train information management device 110A consults the received route information represented by the consecutive block sequence and the block number mapping table illustrated in FIG. 4 to determine a target stopping location. The term "target stopping location" may also be referred to herein as "stop target location." The numbers listed in the "first block number" column and in the "second block number" column illustrated in FIG. 5 are station block numbers.

In one case, if the route information received by the train information management device 110A includes block numbers "5014" and "5015," the name of the arrival track to be used by the incoming train is outbound track 1 having a track name "Out 1." In this case, when the train is traveling in a first direction, the target stopping location is at an in-block position located 150 m from the starting edge of the block numbered "5015," if the number of vehicles is "10" or "15." Meanwhile, when the train is traveling in a second direction opposite the first direction, the target stopping location is at an in-block position located 150 m from the starting edge of the block numbered "5014," if the number of vehicles is "10," and the target stopping location is at an in-block position located 50 m from the starting edge of the block numbered "5014," if the number of vehicles is "15." In this case, the door-controlling in-vehicle wireless station 160 uses a wireless ID of "A-M1," and the door opening side is "seaward." In other words, a seaward door in an outbound train is opened using a wireless ID "A-M1."

Alternatively, if the route information received by the train information management device 110A includes block numbers "5004" and "5005," the name of the arrival track to be used by the incoming train is outbound main track having a track name "Out Main." In this case, the train is traveling in the first direction, and if the number of vehicles is "10" or "15," the target stopping location is at an in-block position located 150 m from the starting edge of the block numbered "5005." In this case, the door-controlling in-vehicle wireless station 160 uses a wireless ID of "A-M2," and the door opening side is "landward." In other words, a landward door in an outbound train is opened using a wireless ID "A-M2."

Furthermore, alternatively, if the route information received by the train information management device 110A includes block numbers "5054" and "5055," the name of the arrival track to be used by the incoming train is inbound main track having a track name "In Main." In this case, the train is traveling in the second direction, and if the number of vehicles is "10," the target stopping location is at an in-block position located 150 m from the starting edge of the block numbered "5054," and if the number of vehicles is "15," the target stopping location is at an in-block position located 50 m from the starting edge of the block numbered "5054." In this case, the door-controlling in-vehicle wireless station 160 uses a wireless ID of "A-M3," and the door opening side is "seaward." In other words, a seaward door in an inbound train is opened using a wireless ID "A-M3."

Still furthermore, alternatively, if the route information received by the train information management device 110A includes block numbers "5064" and "5065," the name of the arrival track to be used by the incoming train is inbound track 1 having a track name "In 1." In this case, when the train is traveling in the first direction, the target stopping location is at an in-block position located 150 m from the starting edge of the block numbered "5065" if the number of vehicles is "10" or "15." Meanwhile, when the train is traveling in the second direction, the target stopping location is at an in-block position located 150 m from the starting edge of the block numbered "5064" if the number of vehicles is "10," and the target stopping location is at an in-block position located 50 m from the starting edge of the block numbered "5064" if the number of vehicles is "15." In this case, the door-controlling in-vehicle wireless station 160 uses a wireless ID of "A-M4," and the door opening side is "landward." In other words, a landward door in an inbound train is opened using a wireless ID "A-M4."

As described above, the train information management device 110A receives the route information before the train arrives at the station, and consults the station block number mapping table in the in-vehicle database to extract the foregoing information, thereby determining the target stopping location. Although the foregoing example assumes that the target stopping location depends on the number of vehicles, the target stopping location does not necessarily need to depend thereon, but may be the same for trains traveling in the same direction irrespective of the number of vehicles. In such case, identification of the travel direction as the train control information enables the target stopping location to be determined.

Having received the route information, the wireless train control unit 111A sends to the automatic operation unit 112 information on the arrival track at the next station and information on the distance to the stop target location, in addition to the travel direction information, the train length information, and the type-of-service information on that train that are routinely sent (step S3) Meanwhile, the wireless train control unit 111A sends to the door control unit 113A information on the arrival track at the next station and information on the door opening side at the next station, in addition to the travel direction information, the train length information, and the type-of-service information on that train that are routinely sent (step S3).

Next, having received the information on the arrival track at the next station and the information on the door opening side at the next station, the door control unit 113A checks the address and the link status corresponding to the next station to establish communication with the platform door control device 10 installed on a ground side of the next station. That is, the wireless ID is identified from the route information received from the wireless train control unit 111A to set the door-controlling in-vehicle wireless station 160 so as to establish communication with the platform door wireless stations 13A and 13B using that wireless ID. After establishment of the communication between the door control unit 113A and the platform door control device 10 installed on the ground side of the next station, the door control unit 113A sends the travel direction information, the train length information, the type-of-service information, and the information on the arrival track at the next station for that train, to the platform door control device 10 (step S4).

Then, upon detecting that the train performs an operation of stopping at the next station, the automatic operation unit 112 sends to the wireless train control unit 111A information indicating the detection of the stoppage (step S5).

The wireless train control unit 111A then sends, to the automatic operation unit 112, an instruction to stop the train within a predetermined allowable distance range from the target stopping location (step S6). The predetermined allowable distance range from the target stopping location as used herein is a range that will not hinder a platform door from opening and closing. An example of such distance range is ±50 cm.

When the train stops within the predetermined allowable distance range from the target stopping location as described above, the automatic operation unit 112 sends a door open instruction to the door control unit 113A (step S7). The term "door open instruction" as used herein means an instruction to open both the platform door and the vehicle door.

Having received the door open instruction, the door control unit 113A sends a platform door open instruction to the platform door control device 10 (step S8). The term "platform door open instruction" as used herein means an instruction to open the platform door.

Having received the platform door open instruction, the platform door control device 10 performs a platform door opening operation, and sends a platform door open ACK signal indicating that the platform door has been opened, to the door control unit 113A (step S9). The term "platform door opening operation" as used herein means an operation to open the platform door.

To open a platform door, as illustrated in FIG. 1, the platform door control device 10 sends the instruction to each of the individual control panels 11a to 11h installed in one-to-one correspondence at the platform doors 12a to 12h that are to be opened. Each of the individual control panels 11a to 11h having received the instruction performs control to open the corresponding one of the platform doors 12a to 12h.

Having received the platform door open ACK signal, the door control unit 113A performs a vehicle door opening operation, and sends a door open ACK signal indicating that both the platform door and the vehicle door have been opened, to the automatic operation unit 112 (step S10). The term "vehicle door opening operation" as used herein means an operation to open the vehicle door.

The process of steps S1 to S10 described above enables both the platform door and the vehicle door to be opened. Then, at a closing timing when the doors are to be closed, the platform door control device 10 sends a vehicle door close instruction to the door control unit 113A (step S11). An example of the closing timing is the departure time of the train after the passengers get on/off the train. The term "vehicle door close instruction" as used herein means an instruction to close the vehicle door.

Having received the vehicle door close instruction, the door control unit 113A performs a vehicle door closing operation, and sends a vehicle door close ACK signal to the platform door control device 10 (step S12). The term "vehicle door closing operation" as used herein means an operation to close the vehicle door.

Having received the vehicle door close ACK signal, the platform door control device 10 performs a platform door closing operation, and sends a platform door closure completion signal to the door control unit 113A (step S13). The term "platform door closing operation" as used herein means an operation to close a platform door.

Having received the platform door closure completion signal, the door control unit 113A sends to the automatic operation unit 112 a door closure completion signal indicating that both the platform door and the vehicle door have been closed (step S14). Upon reception of the door closure completion signal, the automatic operation unit 112 determines that the train is ready to start, and thus controls the train to leave the station. Then, the door control unit 113A disconnects the communication with the ground side of this station.

Thus, the door control system according to this first embodiment can be operated as illustrated in steps S1 to S14 described above.

The train information management device 110A described in connection with this first embodiment sends and receives the information to and from both the train-controlling in-vehicle wireless station 120A that performs the wireless communication for controlling the operation of the train, and the door-controlling in-vehicle wireless station 160 that performs the wireless communication for controlling the vehicle doors 101 and 102 of this train. This train information management device 110A includes the wireless train control unit 111A, the automatic operation unit 112, and the door control unit 113A. The wireless train control unit 111A sends and receives the information to and from the train-controlling in-vehicle wireless station 120A to control the operation of the train, and receives route information represented by the consecutive block sequence and the information on the stop limit location that the train may reach without hindering or interfering with the preceding train. If this route information includes the station block number, the wireless train control unit 111A consults the in-vehicle database stored in the form of the block number mapping table to identify the arrival track where the train is to stop, the stop target location at the stop station dependent on the travel direction, and the side on which the vehicle door is to be opened. The automatic operation unit 112 automatically controls the operation of this train in accordance with the instruction from the wireless train control unit 111A. The door control unit 113A sends and receives the information to and from the door-controlling in-vehicle wireless station 160 to control the opening and closing of the vehicle door of the train. Upon reception of this route information when this train passes the location before the stop station, the wireless train control unit 111A consults the block number mapping table to extract, before the train arrives at the platform, the arrival track at the stop station, the stop target location at the stop station dependent on the travel direction of the train, and the side on which the vehicle door is to be opened, stops the train in accordance with this route information, and controls the vehicle door on one side or on each side in synchronization with the corresponding platform door.

It suffices that the train information management device 110A described in connection with this first embodiment be included only in the leading vehicle of a train. However, the configuration is not limited to this configuration, and a same or similar train information management device may also be included in other vehicle.

Second Embodiment

This second embodiment gives a description of a door control system implementable without including the door-controlling in-vehicle wireless station in the vehicle.

Figure 6:
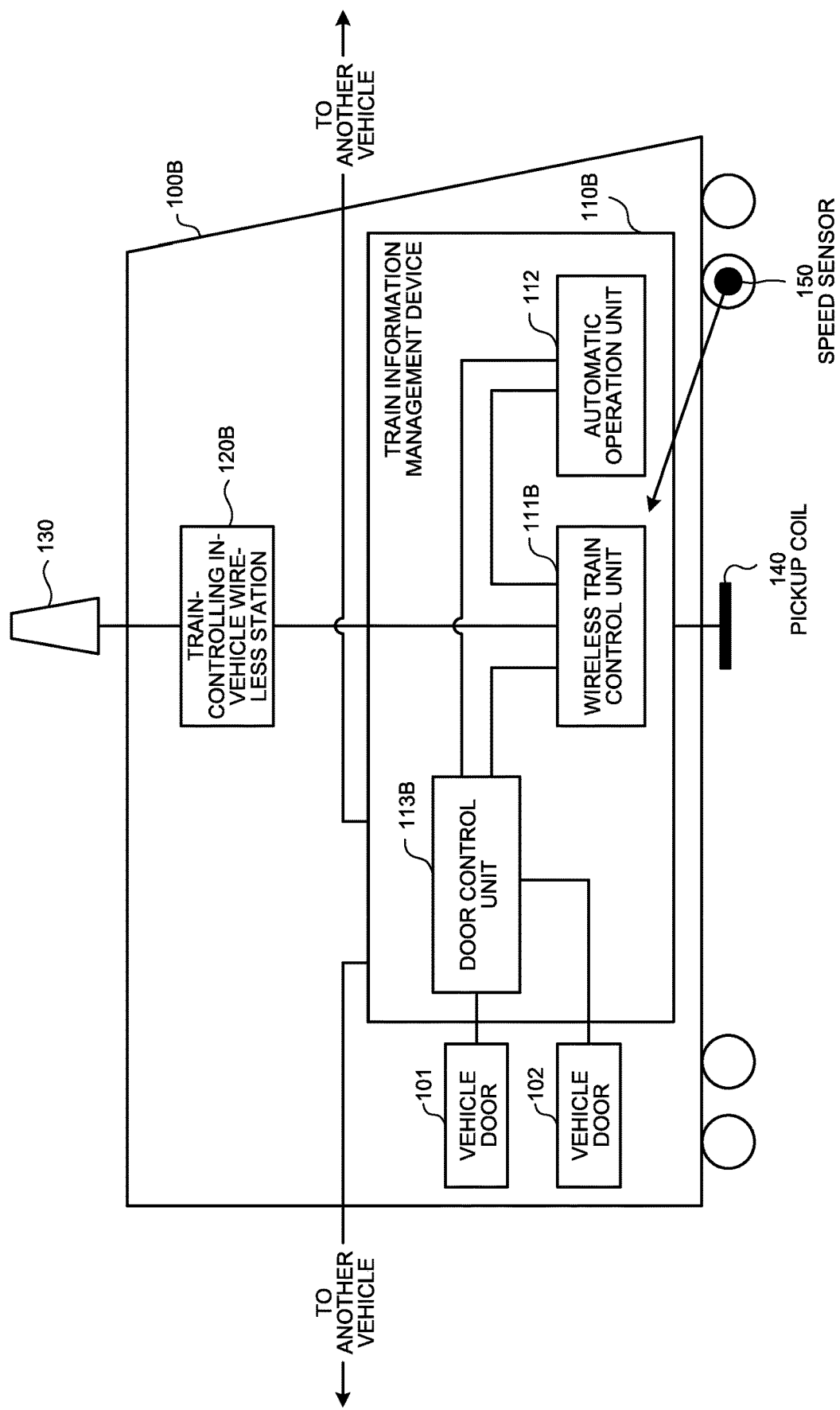
FIG. 6 is a diagram illustrating an example configuration of a train vehicle employing the door control system according to a second embodiment.

FIG. 6 is a diagram illustrating an example of schematic configuration of a train vehicle employing the door control system according to the second embodiment of the present invention. A vehicle 100B illustrated in FIG. 6 represents any one of the vehicles 100a to 100d and the vehicles 100f and 100g illustrated in FIG. 1. The vehicle 100B includes the vehicle doors 101 and 102, a train information management device 110B, a train-controlling in-vehicle wireless station 120B, the antenna 130, the pickup coil 140, and the speed sensor 150. The train information management device 110B includes a wireless train control unit 111B, the automatic operation unit 112, and a door control unit 113B. That is, the train vehicle illustrated in FIG. 6 that uses the door control system according to the second embodiment is configured similarly to the train vehicle illustrated in FIG. 2 that uses the door control system according to the first embodiment, but includes no door-controlling in-vehicle wireless station.

Figure 7:
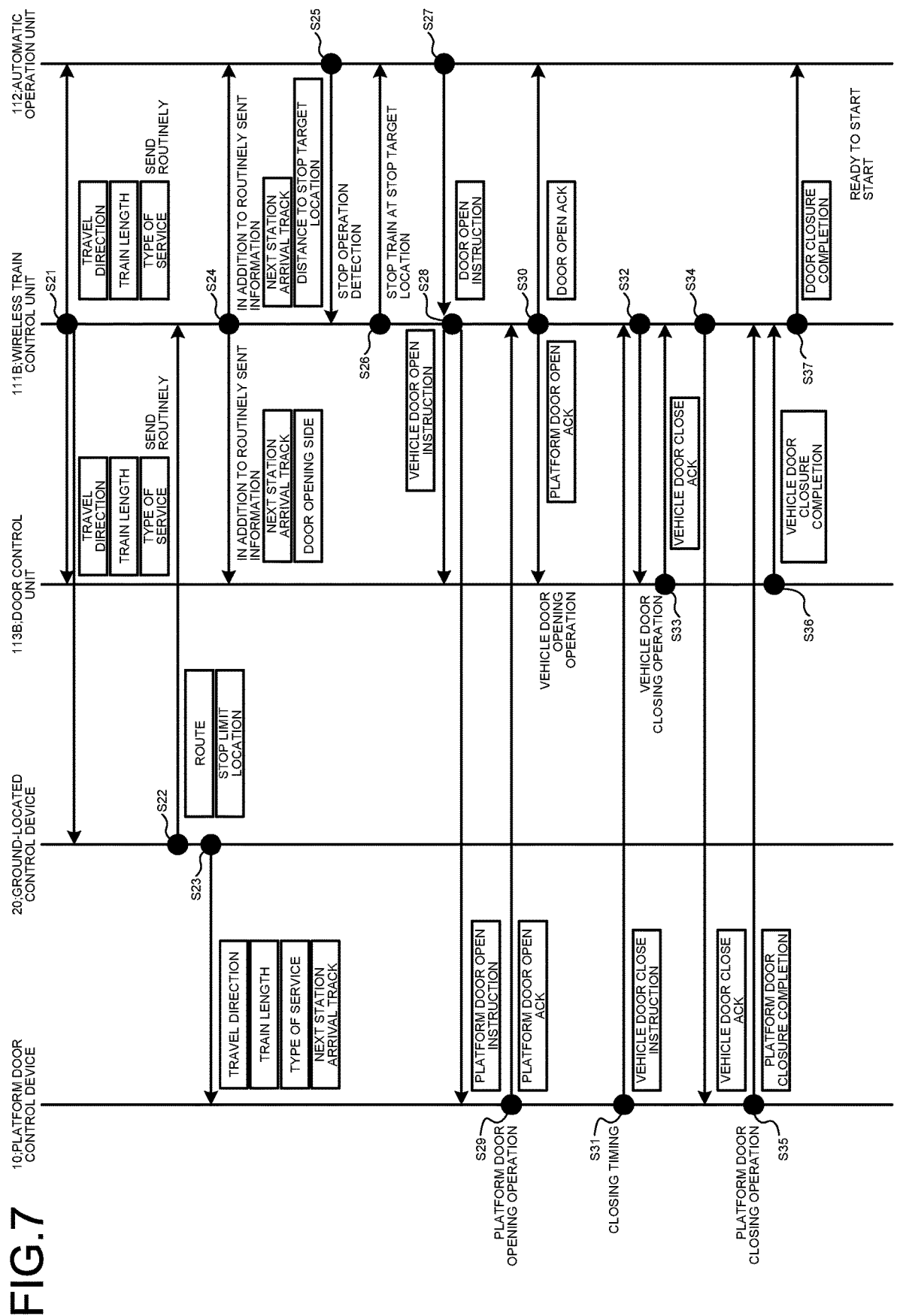
FIG. 7 is a diagram illustrating a sequence in the door control system where the vehicle configuration illustrated in FIG. 6 is applied in the second embodiment.

FIG. 7 is a diagram illustrating a sequence in the door control system where the vehicle configuration illustrated in FIG. 6 according to this second embodiment is applied.

As illustrated in FIG. 7, during train operation, the wireless train control unit 111B routinely sends to the automatic operation unit 112, the door control unit 113B, and the ground-located control device 20 the train control information typified by the travel direction information, the train length information, and the type-of-service information on that train (step S21). The train then approaches the next station that is the stop station. If the next station has a vacant, hence usable, track, the ground-located control device 20 sends the route information represented by a consecutive block sequence and the information on the stop limit location, to the wireless train control unit 111B via the ground-located wireless station (step S22).

The ground-located control device 20 then sends the travel direction information, the train length information, the type-of-service information, and the information on the next station arrival track of that train, to the platform door control device 10 (step S23). Similarly to the wireless train control unit 111A described in connection with the first embodiment, the wireless train control unit 111B stores a block number mapping table, and uses the route information received from the ground-located control device 20 to thereby identify the track to be used by that train at the next station and the door opening side, the door opening side being the side on which the door is to be opened at the next station. The detailed description will be omitted here.

Having received the route information, the wireless train control unit 111B sends to the automatic operation unit 112 information on the arrival track at the next station and information on the distance to the stop target location, in addition to the travel direction information, the train length information, and the type-of-service information on that train that are routinely sent (step S24). Meanwhile, the wireless train control unit 111B sends to the door control unit 113B the information on the track to be used by that train at the next station and information on the door opening side that is the side on which the door is to be opened at the next station, in addition to the travel direction information, the train length information, and the type-of-service information on that train that are routinely sent (step S24).

Then, upon detecting that the train performs an operation of stopping at the next station, the automatic operation unit 112 sends information indicating the detection of the stoppage, to the wireless train control unit 111B (step S25).

The wireless train control unit 111B then sends, to the automatic operation unit 112, an instruction to stop the train within a predetermined allowable distance range from the target stopping location (step S26). As described in connection with the first embodiment, the predetermined allowable distance range from the target stopping location as used herein is a range that will not hinder a platform door from opening and closing. An example of such distance range is ±50 cm.

When the train stops within the predetermined allowable distance range from the target stopping location as described above, the automatic operation unit 112 sends a door open instruction to the wireless train control unit 111B (step S27).

Having received the door open instruction, the wireless train control unit 111B sends a vehicle door open instruction to the door control unit 113B, and sends a platform door open instruction to the platform door control device 10 (step S28). The term "vehicle door open instruction" as used herein means an instruction to open the vehicle door.

Having received the platform door open instruction, the platform door control device 10 performs a platform door opening operation, and sends a platform door open ACK signal indicating that the platform door has been opened, to the wireless train control unit 111B (step S29). Similarly to the case of the first embodiment, to open the platform door, the platform door control device 10 sends the instruction to each of the individual control panels 11a to 11h installed in one-to-one correspondence at the platform doors 12a to 12h that are to be opened. Each of the individual control panels 11a to 11h having received the instruction performs control to open the corresponding one of the platform doors 12a to 12h.

Having received the platform door open ACK signal, the wireless train control unit 111B sends a platform door open ACK signal to the door control unit 113B, and sends a door open ACK signal to the automatic operation unit 112. Having received the platform door open ACK signal, the door control unit 113B performs a vehicle door opening operation (step S30).

The process of steps S21 to S30 described above enables both the vehicle door and the platform door to be opened. Then, at a closing timing when the doors are to be closed, the platform door control device 10 sends a vehicle door close instruction to the wireless train control unit 111B (step S31). An example of the closing timing is the departure time of the train after the passengers get on/off the train.

Having received the vehicle door close instruction, the wireless train control unit 111B sends a vehicle door close instruction to the door control unit 113B (step S32).

Having received the vehicle door close instruction, the door control unit 113B performs a vehicle door closing operation, and then sends a vehicle door close ACK signal to the wireless train control unit 111B (step S33).

Having received the vehicle door close ACK signal, the wireless train control unit 111B sends a vehicle door close ACK signal to the platform door control device 10 (step S34).

Having received the vehicle door close ACK signal, the platform door control device 10 performs a platform door closing operation, and then sends a platform door closure completion signal to the wireless train control unit 111B (step S35).

In addition, the door control unit 113B sends a vehicle door closure completion signal to the wireless train control unit 111B (step S36).

Having received the platform door closure completion signal and the vehicle door closure completion signal, the wireless train control unit 111B sends to the automatic operation unit 112 a door closure completion signal indicating that both the platform door and the vehicle door have been closed (step S37). Thus, the train is ready for start, and leaves the station.

Thus, the door control system according to this second embodiment can be operated as illustrated in steps S21 to S37.

The train information management device 110B described in connection with this second embodiment sends and receives the information to and from the train-controlling in-vehicle wireless station 120B that performs wireless communication for controlling the operation of the train, and wireless communication for controlling the vehicle doors 101 and 102 of this train. This train information management device 110B includes the wireless train control unit 111B, the automatic operation unit 112, and the door control unit 113B. The wireless train control unit 111B sends and receives the information to and from the train-controlling in-vehicle wireless station 120B to control the operation of the train, and receives route information represented by the consecutive block sequence and the information on the stop limit location that the train may reach without hindering or interfering with the preceding train. If this route information includes the station block number, the wireless train control unit 111B consults the in-vehicle database stored in the form of the block number mapping table to identify the arrival track where the train is to stop, the stop target location at a stop station dependent on the travel direction, and the side on which the vehicle door is to be opened. The automatic operation unit 112 automatically controls the operation of this train in accordance with the instruction from the wireless train control unit 111B. The door control unit 113B sends and receives the information to and from the train-controlling in-vehicle wireless station 120B to control the opening and closing of the train vehicle door. Upon reception of this route information when this train passes the location before the stop station, the wireless train control unit 111B consults the block number mapping table to extract, before the train arrives at the platform, the arrival track at the stop station, the stop target location at the stop station dependent on the travel direction of the train, and the side on which the vehicle door is to be opened, stops the train in accordance with this route information, and controls the vehicle door on one side or on each side in synchronization with the corresponding platform door.

Comparison between the first and second embodiments reveals that the configuration of the first embodiment, which requires the door-controlling in-vehicle wireless station, provides the parallel wireless communications for the train control and for the door control, thereby shortening the required time until the control of opening and closing of the doors as well as providing prompt synchronous cooperative control between the vehicle door and the platform door without delay. Accordingly, the configuration of the first embodiment is suitable for a railroad line where an operation on schedule is highly demanded.

In the configuration of the second embodiment, the train-controlling in-vehicle wireless station doubles as the door-controlling in-vehicle wireless station. For example, use of a time division multiplexing (TDM) technique for wireless communication in the train-controlling in-vehicle wireless station will limit the number of communication operations per unit time. Although this limitation may introduce a delay to the information that would be otherwise sent and received by the door-controlling in-vehicle wireless station, the elimination of the need for the door-controlling in-vehicle wireless station achieves the simpler configuration and lower implementation cost. Accordingly, the configuration of the second embodiment is suitable for a railroad line where an operation on schedule is not highly demanded and cost reduction is demanded.

Figure 8:
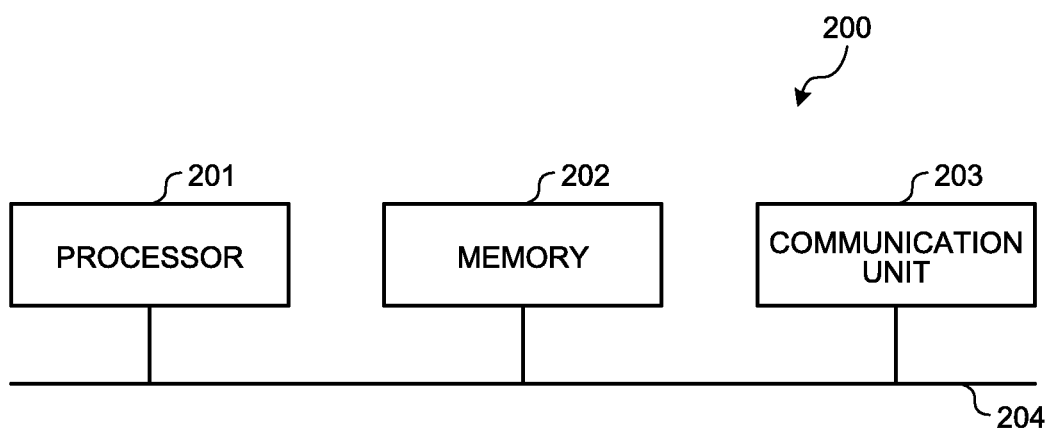
FIG. 8 is a diagram illustrating a general configuration of hardware for implementing the first and second embodiments.

The train information management devices 110A and 110B each include at least a processor, a memory, and a communication unit serving as an input/output interface. The operations of the train information management devices 110A and 110B can be implemented in software. FIG. 8 is a diagram illustrating a general configuration of hardware for implementing such devices. A device 200 illustrated in FIG. 8 includes a processor 201, a memory 202, and a communication unit 203, connected to one another by a bus 204. The processor 201 performs operations and control by software using input data. The memory 202 stores the input data and/or data needed for the processor 201 to perform an operation or control. The communication unit 203 sends and receives information to and from the vehicle doors 101 and 102, the train-controlling in-vehicle wireless stations 120A and 120B, and the door-controlling in-vehicle wireless station 160. Each of the train information management devices 110A and 110B may include a plurality of the processors 201 and a plurality of the memories 202. The block number mapping table is stored in the memory 202.

Figure 9:
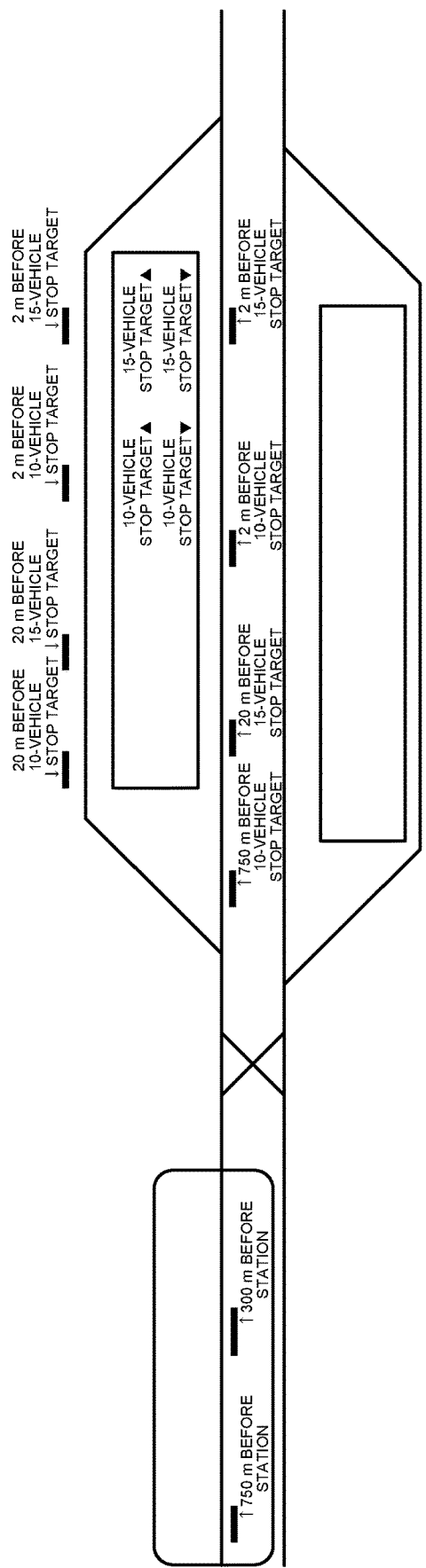
FIG. 9 is a diagram illustrating an example arrangement of wayside coils in the first and second embodiments.

In implementation of the first and second embodiments, the wayside coil is preferably installed in each of multiple locations, i.e., locations before the stop station and locations before the stop target locations. FIG. 9 is a diagram illustrating an example arrangement of the wayside coils. As illustrated in FIG. 9, the wayside coil is disposed in each of locations several hundred meters before the stop station, locations several tens of meters before each stop target location, and locations several meters before each stop target location, thereby eliminating the need for the wayside coil in the middle of the station for the automatic operation unit. Moreover, sending, to the automatic operation unit, information that has been corrected using a location correction wayside coil of the wireless train control unit enables the train to stop at the stop target location with high accuracy.

The configurations described in the first and second embodiments are merely examples of various aspects of the present invention. These configurations may be combined with a known other technology, and moreover, a part of such configurations may be omitted and/or modified without departing from the spirit of the present invention.

REFERENCE SIGNS LIST 10 platform door control device; 11a, 11b, 11c, 11d, 11e, 11f, 11g, 11h individual control panel; 12a, 12b, 12c, 12d, 12e, 12f, 12g, 12h platform door; 13A, 13B platform door wireless station; 14 station; 100A, 100B, 100a, 100b, 100c, 100d, 100f, 100g vehicle; 101, 101a, 101b, 101c, 101d, 101f, 101g, 102, 102a, 102b, 102c, 102d, 102f, 102g vehicle door; 110A, 110B, 110a, 110b, 110c, 110d, 110f, 110g train information management device; 111A, 111B, 111a, 111b, 111c, 111d, 111f, 111g wireless train control unit; 112, 112a, 112b, 112c, 112d, 112f, 112g automatic operation unit; 113A, 113B, 113a, 113b, 113c, 113d, 113f, 113g door control unit; 120A, 120B train-controlling in-vehicle wireless station; 130 antenna; 140 in-vehicle unit; 150 speed sensor; 160, 160a, 160b, 160c, 160d, 160f, 160g door-controlling in-vehicle wireless station; 200 device; 201 processor; 202 memory; 203 communication unit; 204 bus.

The invention claimed is:
1. A train information management device comprising:
a train-controlling in-vehicle wireless station to receive from a ground-located control device, route information indicated by a consecutive block sequence and information on a stop limit location; and a wireless train controller to, before a train arrives at a stop station, refer to a station block number and a station block number mapping table in an in-vehicle database to extract information regarding an arrival track at the stop station, a stop target location at the stop station, and a side on which to open a vehicle door of the train, and stop the train in accordance with the route information, the station block number being extracted from the route information indicated by the consecutive block sequence and the information on the stop limit location received from the train-controlling in-vehicle wireless station, the in-vehicle database being disposed on the train.

2. The train information management device according to claim 1, further comprising:
a door controller to control opening and closing of the vehicle door of the train,
wherein the wireless train controller sends to the door controller the information regarding the arrival track at the stop station and information on the door opening side at the stop station.

3. The train information management device according to claim 2, further comprising:
an automatic operation controller to automatically control an operation of the train in accordance with an instruction from the wireless train controller,
wherein, after the train stops, the automatic operation controller sends to the wireless train controller a door open instruction to open a platform door installed in the stop station and open the vehicle door of the train.

4. The train information management device according to claim 2, further comprising:
an automatic operation controller to automatically control an operation of the train in accordance with an instruction from the wireless train controller,
wherein, after the train stops, the automatic operation controller sends to the door controller a door open instruction to open a platform door installed in the stop station and open the vehicle door of the train.

5. The train information management device according to claim 4, wherein, after reception of the door open instruction, the door controller sends a platform door open instruction to a platform door control device to control opening and closing of the platform door.

6. The train information management device according to claim 3, wherein the wireless train controller sends a vehicle door open instruction to the door controller, and sends a platform door open instruction to a platform door control device to control opening and closing of the platform door.

7. A door control system comprising:
a train-controlling in-vehicle wireless station to receive from a ground-located control device, route information indicated by a consecutive block sequence and information on a stop limit location, and
a train information management device including a wireless train controller to, before a train arrives at a stop station, refer to a station block number and a station block number mapping table in an in-vehicle database to extract information regarding an arrival track at the stop station, a stop target location at the stop station, and a side on which to open a vehicle door of the train, and stop the train in accordance with the route information, the station block number being extracted from the route information indicated by the consecutive block sequence and the information on the stop limit location received from the train-controlling in-vehicle wireless station, the in-vehicle database being disposed on the train; and
a platform door control device to control opening and closing of a platform door installed in the stop station,
wherein the train and the platform door control device wirelessly communicate with each other to provide cooperative control between the vehicle door of the train and the platform door.

* * * * *